United States Patent
Andreasson et al.

(10) Patent No.: US 9,302,224 B2
(45) Date of Patent: *Apr. 5, 2016

(54) CATALYTIC REDUCTION OF $NO_x$

(71) Applicants: Daimler AG, Stuttgart (DE); HJS Emission Technology GmbH & Co. Ltd., Menden (DE); Johnson Matthey Public Limited Company, London (GB)

(72) Inventors: Anders Andreasson, Frolunda (SE); Guy Richard Chandler, Cambridge (GB); Claus Friedrich Goersmann, Cambridge (GB); James Patrick Warren, Cambridge (GB); Georg Hüthwohl, Soest (DE)

(73) Assignees: Daimler AG, Stuttgart (DE); HJS Emission Technology GmbH & Co. Ltd., Menden (DE); Johnson Matthey Public Limited Company, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 14/488,304

(22) Filed: Sep. 17, 2014

(65) Prior Publication Data

US 2015/0004068 A1 Jan. 1, 2015

Related U.S. Application Data

(63) Continuation of application No. 14/468,392, filed on Aug. 26, 2014, now abandoned, which is a continuation of application No. 13/843,870, filed on Mar. 15, 2013, now Pat. No. 8,833,062, which is a (Continued)

(30) Foreign Application Priority Data

Feb. 6, 1998 (GB) .................. 9802504.2

(51) Int. Cl.
F01N 3/00 (2006.01)
F01N 3/02 (2006.01)
(Continued)

(52) U.S. Cl.
CPC ........ B01D 53/9477 (2013.01); B01D 53/9431 (2013.01); F01N 3/0231 (2013.01);
(Continued)

(58) Field of Classification Search
USPC ............ 60/286, 295, 297, 299, 300, 301, 311
See application file for complete search history.

(56) References Cited

U.S. PATENT DOCUMENTS 4,902,487 A * 2/1990 Cooper et al. ............. 423/215.5
5,746,989 A * 5/1998 Murachi et al. ............ 423/213.7

(Continued)

OTHER PUBLICATIONS

Catalyst for NOx Removal in Nitric-Acid Plant Gaseous Effluents, Atmospheric Environment, vol. 27A, No. 3, pp. 443-447, Perganon Press Ltd., 1993.*

(Continued)

*Primary Examiner* — Audrey K Bradley
*Assistant Examiner* — Dapinder Singh
(74) *Attorney, Agent, or Firm* — Brummett TechLaw PLLC

(57) ABSTRACT

A system for $NO_x$ reduction in combustion gases, especially from diesel engines, incorporates an oxidation catalyst to convert at least a portion of NO to $NO_2$, particulate filter, a source of reductant such as $NH_3$ and an SCR catalyst and methods for operating such a system are disclosed. Considerable improvements in $NO_x$ conversion and soot reduction are observed even at relatively low operating temperatures.

34 Claims, 4 Drawing Sheets

Related U.S. Application Data continuation of application No. 13/204,634, filed on Aug. 5, 2011, now Pat. No. 8,480,986, which is a continuation of application No. 12/380,414, filed on Feb. 27, 2009, now Pat. No. 8,142,747, which is a continuation of application No. 10/886,778, filed on Jul. 8, 2004, now Pat. No. 7,498,010, which is a continuation of application No. 09/601,694, filed as application No. PCT/GB99/00292 on Jan. 28, 1999, now Pat. No. 6,805,849.

(51) Int. Cl.
    *F01N 3/10*      (2006.01)
    *F01N 3/20*      (2006.01)
    *B01D 53/94*      (2006.01)
    *F01N 3/023*      (2006.01)

(52) U.S. Cl.
    CPC ............ *F01N3/2066* (2013.01); *B01D 53/944* (2013.01); *B01D 53/9418* (2013.01); *B01D 2251/2067* (2013.01); *B01D 2255/1021* (2013.01); *B01D 2255/50* (2013.01); *B01D 2258/012* (2013.01); *F01N 2590/08* (2013.01); *F01N 2610/02* (2013.01); *F01N 2900/1404* (2013.01)

(56) References Cited

U.S. PATENT DOCUMENTS 5,809,775 A  *   9/1998   Tarabulski et al. .............. 60/274
6,235,254 B1 *   5/2001   Murphy et al. ............... 423/212

OTHER PUBLICATIONS

Notification of Reasons for Refusal received in counterpart Japanese Application No. 2013-233354.

* cited by examiner

CATALYTIC REDUCTION OF NO$_x$

CROSS REFERENCE TO RELATED APPLICATIONS

This application is a continuation of U.S. application Ser. No. 14/468,392, filed Aug. 26, 2014, which was a continuation of U.S. application Ser. No. 13/843,870, filed Mar. 15, 2013, now U.S. Pat. No. 8,833,062, which was a continuation of Ser. No. 13/204,634, filed Aug. 5, 2011, now U.S. Pat. No. 8,480,986, which was a continuation of U.S. application Ser. No. 12/380,414, filed Feb. 27, 2009, now U.S. Pat. No. 8,142,747, which is a continuation of U.S. application Ser. No. 10/886,778, filed Jul. 8, 2004, now U.S. Pat. No. 7,498,010, which is a divisional application of U.S. application Ser. No. 09/601,694, filed Jan. 9, 2001, now U.S. Pat. No. 6,805,849, which is the U.S. National Phase of International Application No. PCT/GB 1999/000292, filed Jan. 28, 1999, and which claims the benefit of priority from British Application No. 9802504.2, filed Feb. 6, 1998. These applications, in their entirety, are incorporated herein by reference.

SUMMARY OF THE INVENTION

The present invention concerns improvements in selective catalytic reduction of NO$_x$ in waste gas streams such as diesel engine exhausts or other lean exhaust gases such as from gasoline direct injection (GDI).

BACKGROUND OF THE INVENTION

The technique named SCR (Selective Catalytic Reduction) is well established for industrial plant combustion gases, and may be broadly described as passing a hot exhaust gas over a catalyst in the presence of a nitrogenous reductant, especially ammonia or urea. This is effective to reduce the NO$_x$ content of the exhaust gases by about 20-25% at about 250° C., or possibly rather higher using a platinum catalyst, although platinum catalysts tend to oxidise NH$_3$ to NO$_x$ during higher temperature operation. We believe that SCR systems have been proposed for NO$_x$ reduction for vehicle engine exhausts, especially large or heavy duty diesel engines, but this does require on-board storage of such reductants, and is not believed to have met with commercial acceptability at this time.

We believe that if there could be a significant improvement in performance of SCR systems, they would find wider usage and may be introduced into vehicular applications. It is an aim of the present invention to improve significantly the conversion of NO$_x$ in a SCR system, and to improve the control of other pollutants using a SCR system.

DETAILED DESCRIPTION OF THE INVENTION

Figure 1:
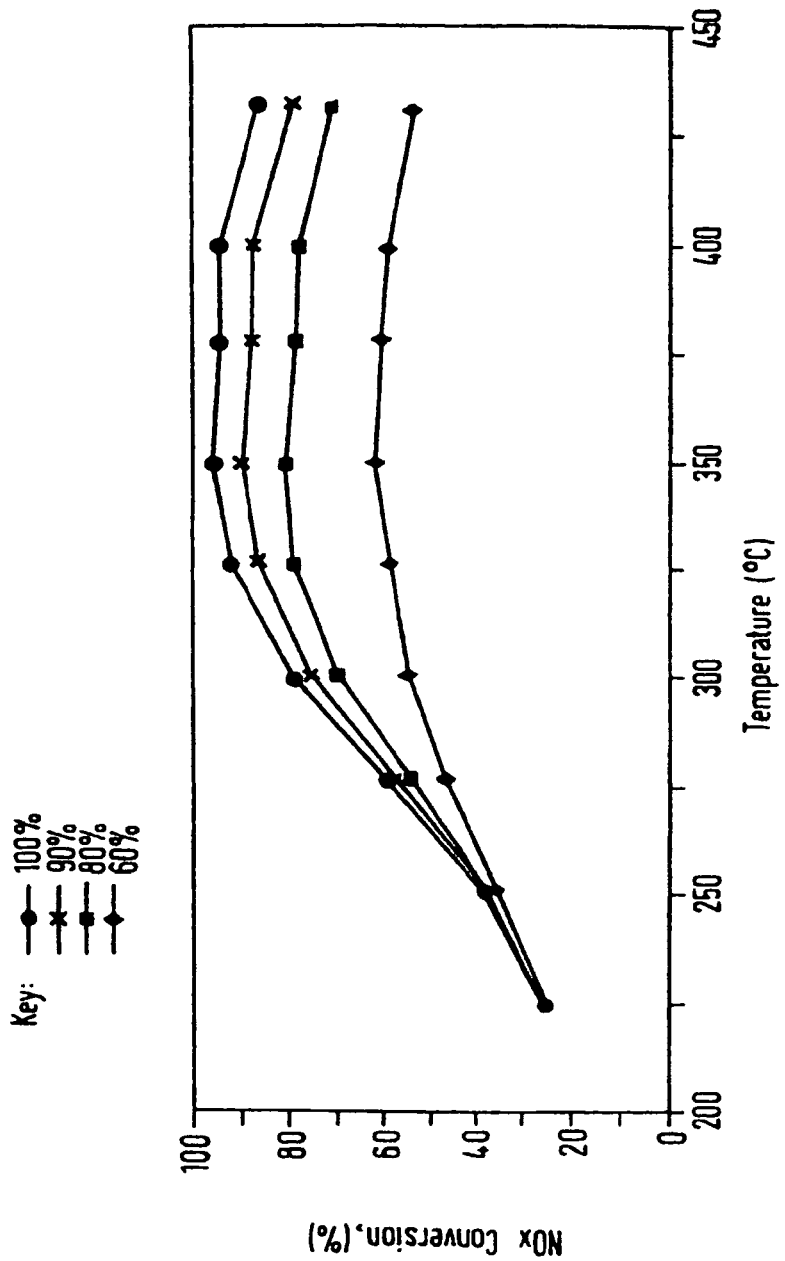
FIG. 1 is a graph plotting percentage NO$_x$ conversion against temperature resulting from Test 1.

Accordingly, the present invention provides an improved SCR catalyst system, comprising in combination and in order, an oxidation catalyst effective to convert NO to NO$_2$, a particulate filter, a source of reductant fluid and downstream of said source, an SCR catalyst.

The invention further provides an improved method of reducing NO$_x$ in gas streams containing NO and particulates comprising passing such gas stream over an oxidation catalyst under conditions effective to convert at least a portion of NO in the gas stream to NO$_2$, removing at least a portion of said particulates, adding reductant fluid to the gas stream containing enhanced NO$_2$ to form a gas mixture, and passing the gas mixture over an SCR catalyst.

Although the present invention provides, at least in its preferred embodiments, the opportunity to reduce very significantly the NO$_x$ emissions from the lean (high in oxygen) exhaust gases from diesel and similar engines, it is to be noted that the invention also permits very good reductions in the levels of other regulated pollutants, especially hydrocarbons and particulates.

The invention is believed to have particular application to the exhausts from heavy duty diesel engines, especially vehicle engines, e.g., truck or bus engines, but is not to be regarded as being limited thereto. Other applications might be LDD (light duty diesel), GDI, CNG (compressed natural gas) engines, ships or stationary sources. For simplicity, however, the majority of this description concerns such vehicle engines.

We have surprisingly found that a "pre-oxidising" step, which is not generally considered necessary because of the low content of CO and unburnt fuel in diesel exhausts, is particularly effective in increasing the conversion of NO$_x$ to N$_2$ by the SCR system. We also believe that minimising the levels of hydrocarbons in the gases may assist in the conversion of NO to NO$_2$. This may be achieved catalytically and/or by engine design or management. Desirably, the NO$_2$/NO ratio is adjusted according to the present invention to the most beneficial such ratio for the particular SCR catalyst and CO and hydrocarbons are oxidized prior to the SCR catalyst. Thus, our preliminary results indicate that for a transition metal/zeolite SCR catalyst it is desirable to convert all NO to NO$_2$, whereas for a rare earth-based SCR catalyst, a high ratio is desirable providing there is some NO, and for other transition metal-based catalysts gas mixtures are notably better than either substantially only NO or NO$_2$. Even more surprisingly, the incorporation of a particulate filter permits still higher conversions of NO$_x$.

The oxidation catalyst may be any suitable catalyst, and is generally available to those skilled in art. For example, a Pt catalyst deposited upon a ceramic or metal through-flow honeycomb support is particularly suitable. Suitable catalysts are, e.g., Pt/Al$_2$O$_3$ catalysts, containing 1-150 g Pt/ft$^3$ (0.035-5.3 g Pt/liter) catalyst volume depending on the NO$_2$/NO ratio required. Such catalysts may contain other components providing there is a beneficial effect or at least no significant adverse effect.

The source of reductant fluid conveniently uses existing technology to inject fluid into the gas stream. For example, in the tests for the present invention, a mass controller was used to control supply of compressed NH$_3$, which was injected through an annular injector ring mounted in the exhaust pipe. The injector ring had a plurality of injection ports arranged around its periphery. A conventional diesel fuel injection system including pump and injector nozzle has been used to inject urea by the present applicants. A stream of compressed air was also injected around the nozzle; this provided good mixing and cooling.

The reductant fluid is suitably NH$_3$, but other reductant fluids including urea, ammonium carbamate and hydrocarbons including diesel fuel may also be considered. Diesel fuel is, of course, carried on board a diesel-powered vehicle, but diesel fuel itself is a less selective reductant than $NH_3$ and is presently not preferred.

Suitable SCR catalysts are available in the art and include Cu-based and vanadia-based catalysts. A preferred catalyst at present is a $V_2O_5/WO_3/TiO_2$ catalyst, supported on a honeycomb through-flow support. Although such a catalyst has shown good performance in the tests described hereafter and is commercially available, we have found that sustained high temperature operation can cause catalyst deactivation. Heavy duty diesel engines, which are almost exclusively turbocharged, can produce exhaust gases at greater than 500° C. under conditions of high load and/or high speed, and such temperatures are sufficient to cause catalyst deactivation.

In one embodiment of the invention, therefore, cooling means is provided upstream of the SCR catalyst. Cooling means may suitably be activated by sensing high catalyst temperatures or by other, less direct, means, such as determining conditions likely to lead to high catalyst temperatures. Suitable cooling means include water injection upstream of the SCR catalyst, or air injection, for example utilizing the engine turbocharger to provide a stream of fresh intake air by-passing the engine. We have observed a loss of activity of the catalyst, however, using water injection, and air injection by modifying the turbocharger leads to higher space velocity over the catalyst which tends to reduce NO conversion. Preferably, the preferred SCR catalyst is maintained at a temperature from 160° C. to 450° C.

We believe that in its presently preferred embodiments, the present invention may depend upon an incomplete conversion of NO to $NO_2$. Desirably, therefore, the oxidation catalyst, or the oxidation catalyst together with the particulate trap if used, yields a gas stream entering the SCR catalyst having a ratio of NO to $NO_2$ of from about 4:1 to about 1:3 by volume, for the commercial vanadia-type catalyst. As mentioned above, other SCR catalysts perform better with different $NO/NO_2$ ratios. We do not believe that it has previously been suggested to adjust the $NO/NO_2$ ratio in order to improve NO reduction.

The present invention incorporates a particulate trap downstream of the oxidation catalyst. We discovered that soot-type particulates may be removed from a particulate trap by "combustion" at relatively low temperatures in the presence of $NO_2$. In effect, the incorporation of such a particulate trap serves to clean the exhaust gas of particulates without causing accumulation, with resultant blockage or back-pressure problems, whilst simultaneously reducing a proportion of the NOR. Suitable particulate traps are generally available, and are desirably of the type known as wall-flow filters, generally manufactured from a ceramic, but other designs of particulate trap, including woven knitted or non-woven heat-resistant fabrics, may be used.

It may be desirable to incorporate a clean-up catalyst downstream of the SCR catalyst, to remove any $NH_3$ or derivatives thereof which could pass through unreacted or as by-products. Suitable clean-up catalysts are available to the skilled person.

A particularly interesting possibility arising from the present invention has especial application to light duty diesel engines (car and utility vehicles) and permits a significant reduction in volume and weight of the exhaust gas after-treatment system, in a suitable engineered system.

EXAMPLES

Several tests have been carried out in making the present invention. These are described below, and are supported by results shown in graphical form in the attached drawings.

A commercial 10 liter turbocharged heavy duty diesel engine on a test-bed was used for all the tests described herein.

Test 1—(Comparative)

A conventional SCR system using a commercial $V_2O_5/WO_3/TiO_2$ catalyst, was adapted and fitted to the exhaust system of the engine. $NH_3$ was injected upstream of the SCR catalyst at varying ratios. The $NH_3$ was supplied from a cylinder of compressed gas and a conventional mass flow controller used to control the flow of $NH_3$ gas to an experimental injection ring. The injection ring was a 10 cm diameter annular ring provided with 20 small injection ports arranged to inject gas in the direction of the exhaust gas flow. $NO_x$ conversions were determined by fitting a $NO_x$ analyser before and after the SCR catalyst and are plotted against exhaust gas temperature in FIG. 1. Temperatures were altered by maintaining the engine speed constant and altering the torque applied.

A number of tests were run at different quantities of $NH_3$ injection, from 60% to 100% of theoretical, calculated at 1:1 $NH_3/NO$ and 4:3 $NH_3/NO_2$. It can readily be seen that at low temperatures, corresponding to light load, conversions are about 25%, and the highest conversions require stoichiometric (100%) addition of $NH_3$ at catalyst temperatures of from 325 to 400° C., and reach about 90%. However, we have determined that at greater than about 70% of stoichiometric $NH_3$ injection, $NH_3$ slips through the SCR catalyst unreacted, and can cause further pollution problems.

Test 2 (Comparative)

Figure 2:
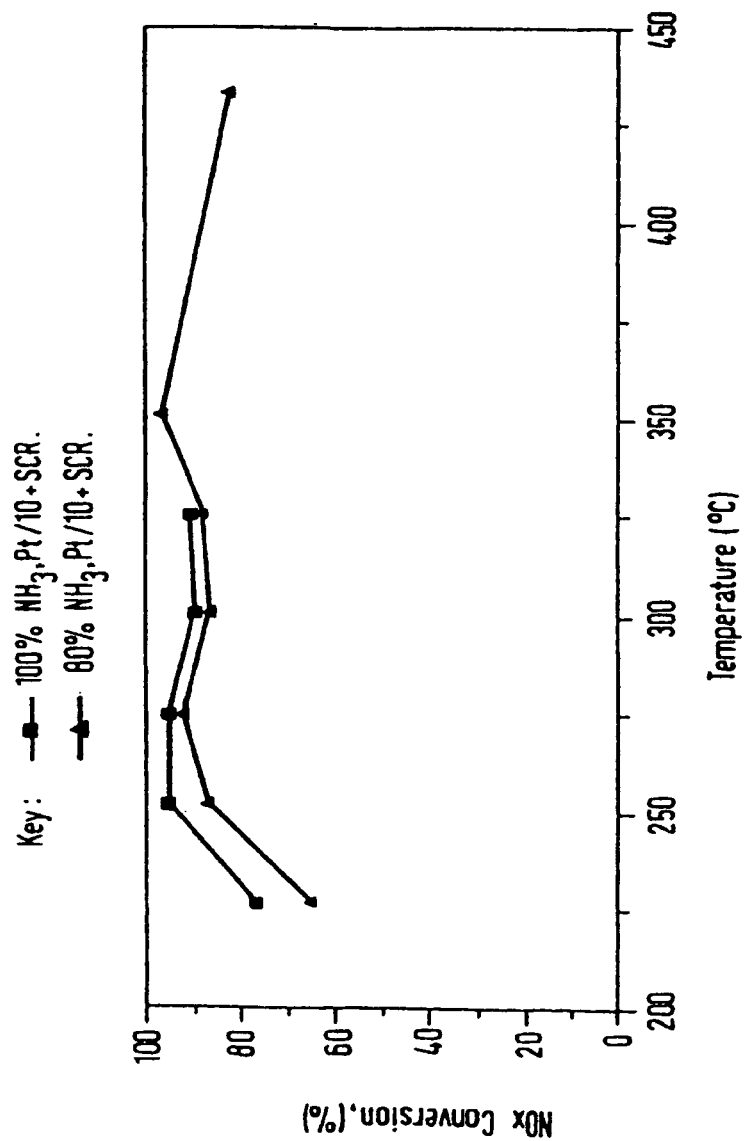
FIG. 2 is a graph plotting percentage NO$_x$ conversion against temperature resulting from Test 2.

The test rig was modified by inserting into the exhaust pipe upstream of the $NH_3$ injection, a commercial platinum oxidation catalyst of 10.5 inch diameter and 6 inch length (26.67 cm diameter and 15.24 cm length) containing 10 g $Pt/ft^3$ (=0.35 g/liter) of catalyst volume. Identical tests were run, and it was observed from the results plotted in FIG. 2, that even at 225° C., the conversion of $NO_x$ has increased from 25% to >60%. The greatest conversions were in excess of 95%. No slippage of $NH_3$ was observed in this test nor in the following test.

Test 3

Figure 3:
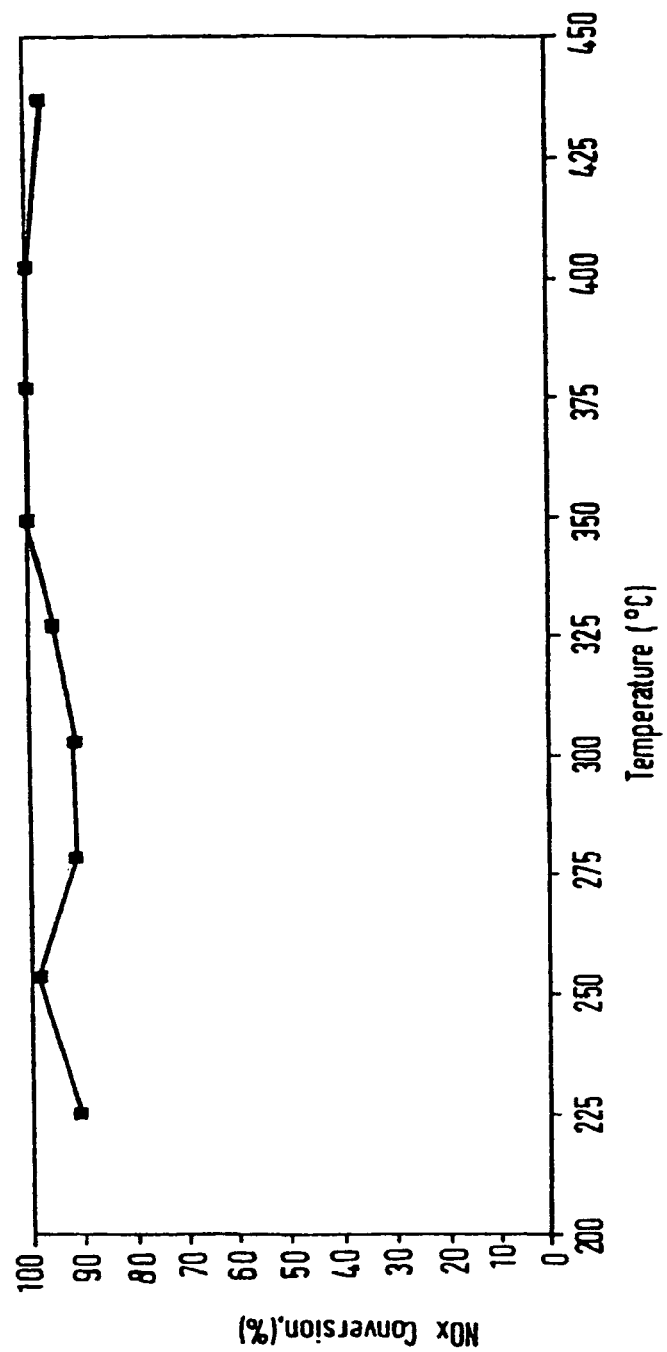
FIG. 3 is a graph plotting percentage NO$_x$ conversion against temperature resulting from Test 3.

The test rig was modified further, by inserting a particulate trap before the $NH_3$ injection point, and the tests run again under the same conditions at 100% $NH_3$ injection and a space velocity in the range 40,000 to 70,000 $hr^{-1}$ over the SCR catalyst. The results are plotted and shown in FIG. 3. Surprisingly, there is a dramatic improvement in $NO_x$ conversion, to above 90% at 225° C., and reaching 100% at 350° C. Additionally, of course, the particulates, which are the most visible pollutant from diesel engines, are also controlled.

Test 4

Figure 4:
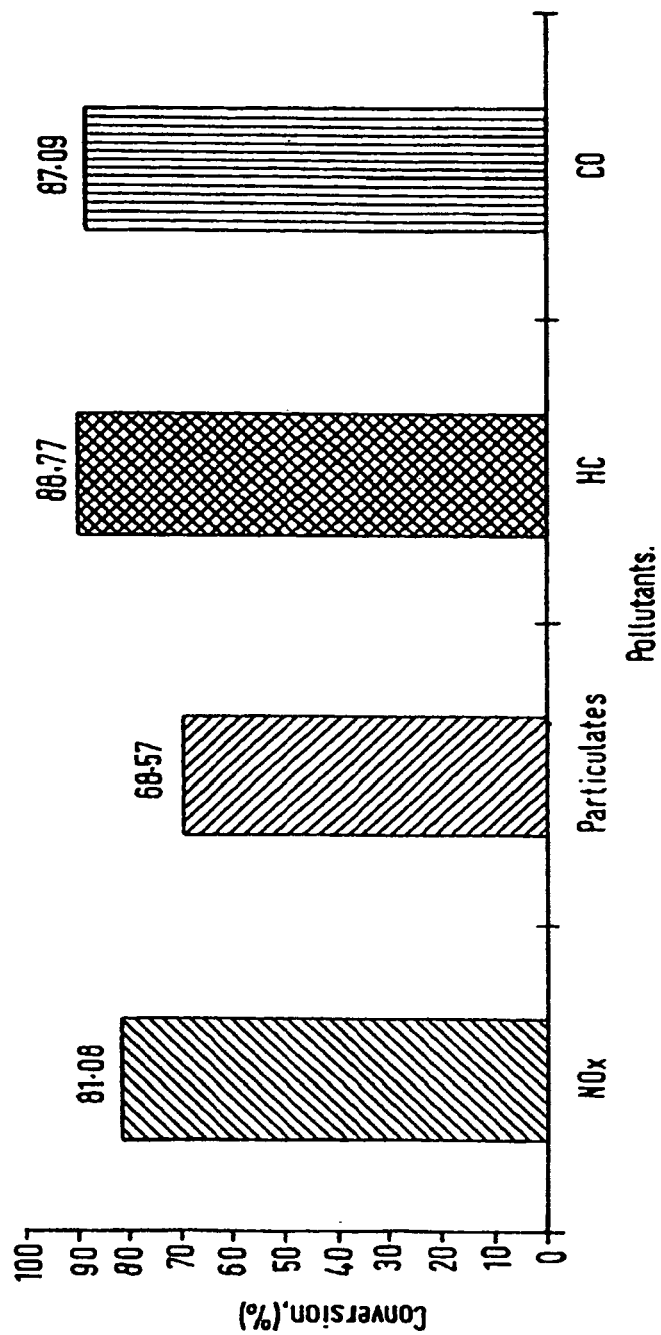
FIG. 4 is a bar graph showing percentage conversion of pollutants [NO$_x$, particulates, hydrocarbons (HC) and carbon monoxide (CO)] resulting from Test 4.

An R49 test with 80% $NH_3$ injection was carried out over a $V_2O_5/WO_3/TiO_2$ SCR catalyst. This gave 67% particulate, 89% HC and 87% $NO_x$ conversion; the results are plotted in FIG. 4.

Additionally tests have been carried out with a different diesel engine, and the excellent results illustrated in Tests 3 and 4 above have been confirmed.

The results have been confirmed also for a non-vanadium SCR catalyst.

We claim:

1. A system comprising:
a heavy duty diesel truck engine, the heavy duty diesel truck engine configured to produce an exhaust gas comprising particulate matter, NO, and $NO_2$;
an oxidation catalyst in exhaust gas communication with the heavy duty diesel engine, the oxidation catalyst configured to convert a substantial portion of the NO in the exhaust gas to $NO_2$;
a particulate trap in exhaust gas communication downstream of the oxidation catalyst, the particulate trap configured to react a portion of the $NO_2$ in the exhaust gas with a substantial portion of the particulate matter in the particulate trap;
a urea reductant injector positioned downstream of the particulate trap, the urea reductant injector configured to inject a metered dose of urea reductant into the exhaust gas;
an SCR catalyst, the SCR catalyst configured to reduce the NO and $NO_2$ in the exhaust gas;
wherein the system is configured to operate at a sufficient temperature to react $NO_2$ with particulate matter in the particulate trap, and
further wherein the oxidation catalyst and the particulate trap are configured to collectively modify the exhaust gas such that it has an NO to $NO_2$ ratio of about 4:1 to 1:3 when the exhaust gas exits the particulate trap.

2. The system of claim 1, wherein the exhaust gas is between 225° C. and 350° C.

3. The system of claim 1, wherein the exhaust gas is between 250° C. and 425° C.

4. The system of claim 1, wherein the exhaust gas is between 225° C. and 425° C.

5. The system of claim 4, wherein the heavy duty diesel truck engine is configured for mobile use.

6. The system of claim 5, wherein the heavy duty diesel truck engine is turbocharged.

7. The system of claim 6, wherein the oxidation catalyst comprises a Pt catalyst deposited upon a through-flow honeycomb support.

8. The system of claim 7, wherein the SCR catalyst comprises a transitional metal/zeolite catalyst.

9. The system of claim 8, further comprising a clean-up catalyst configured to remove $NH_3$ from the exhaust gas.

10. The system of claim 9, wherein the oxidation catalyst and particulate trap are sized and configured such that under the majority of normal on-road operational conditions of the heavy duty diesel truck engine the exhaust gas has a ratio of NO to $NO_2$ of about 4:1 to 1:3 when the exhaust gas exits the particulate trap.

11. The system of claim 10, wherein the urea injector is configured to adjust the amount of urea injected into the exhaust gas stream based at least in part upon the $NO:NO_2$ ratio of the $NO_x$ in the exhaust gas stream.

12. The system of claim 11, wherein the system is configured such that under the majority of normal on-road operational conditions of the heavy duty diesel truck engine the exhaust gas has at least 90% less $NO_x$ as it exits the SCR catalyst than the exhaust gas contained before it entered the oxidation catalyst.

13. The system of claim 12, further comprising a clean-up catalyst in exhaust gas communication downstream of the second SCR catalyst, the clean-up catalyst to remove $NH_3$ from the exhaust gas.

14. A system comprising:
a first sub-assembly comprising a urea injector in exhaust gas communication with an SCR catalyst, and
a second sub-assembly upstream of the first sub-assembly comprising a Pt oxidation catalyst deposited upon a through-flow honeycomb support in exhaust gas communication with a wall flow particulate filter specifically configured:
(1) for use with a mobile heavy duty diesel truck engine; and
(2) for adjusting the NO to $NO_2$ ratio of an exhaust gas stream such that:
(i) under identical conditions and duration of operation, more particulate matter is combusted in the particulate filter than would be combusted in the absence of the oxidation catalyst; and
(ii) the $NO:NO_2$ ratio of the exhaust gas exiting the particulate filter during continuous particulate combustion conditions is suitable for reducing a substantial portion of the remaining $NO_x$ as the exhaust gas passes over the SCR catalyst.

15. The system of claim 14, wherein the second sub-assembly is configured for use with an exhaust gas stream between 225° C. and 350° C.

16. The system of claim 14, wherein the second sub-assembly is configured for use with an exhaust gas stream between 250° C. and 425° C.

17. The system of claim 14, wherein the second sub-assembly is configured for use with an exhaust gas stream between 225° C. and 425° C.

18. The system of claim 17, wherein the second sub-assembly is configured for use with a turbocharged heavy duty diesel truck engine.

19. The system of claim 17, wherein the second sub-assembly is sized and configured such that under the majority of normal on-road operational conditions of the heavy duty diesel truck engine the exhaust gas stream has a ratio of NO to $NO_2$ of about 4:1 to 1:3 when the exhaust gas stream exits the particulate trap.

20. The system of claim 19, wherein the SCR catalyst comprises a transitional metal/zeolite catalyst.

21. The system of claim 20, wherein the urea injector is configured to adjust the amount of urea injected into the exhaust gas stream based at least in part upon the $NO:NO_2$ ratio of the $NO_x$ in the exhaust gas stream.

22. The system of claim 21, wherein the first sub-assembly and the second sub-assembly are configured such that under the majority of normal on-road operational conditions of the heavy duty diesel truck engine the exhaust gas stream has at least 90% less NOx as it exits the SCR catalyst than the exhaust gas stream contained before it entered the oxidation catalyst.

23. The system of claim 22, further comprising a clean-up catalyst in exhaust gas communication downstream of the SCR catalyst, the clean-up catalyst configured to remove $NH_3$ from the exhaust gas.

24. A system comprising:
a turbocharged heavy-duty diesel truck engine, the heavy-duty diesel truck engine configured to produce an exhaust gas comprising soot-type particulate matter, NO, and $NO_2$;
a Pt oxidation catalyst deposited upon a ceramic through-flow honeycomb support in exhaust gas communication with the heavy-duty diesel engine,
a wall-flow particulate trap in exhaust gas communication downstream of the honeycomb support, the particulate trap configured to combust, at a temperature of between 250° C. and 425° C., at least a substantial portion of the soot-type particulates in the exhaust gas, an SCR catalyst in exhaust gas communication downstream of the particulate trap, the SCR catalyst configured to reduce the NO and $NO_2$ in the exhaust gas;

a urea reductant injector configured to inject a metered dose of urea reductant into the exhaust gas upstream of the SCR catalyst;

wherein the system is configured such that, under the majority of normal on-road operational conditions of the heavy-duty diesel truck engine, the exhaust gas exiting the particulate trap has an NO to $NO_2$ ratio of about 4:1 to 1:3, and the exhaust gas exiting the SCR catalyst has at least 90% less NOx relative to an NOx content in the exhaust gas entering the oxidation catalyst.

25. The system of claim 24, further comprising a clean-up catalyst in exhaust gas communication downstream of the SCR catalyst, the clean-up catalyst configured to remove $NH_3$ from the exhaust gas.

26. A system comprising:

a turbocharged heavy-duty diesel truck engine, the heavy-duty diesel truck engine configured to produce an exhaust gas comprising soot-type particulate matter, NO, and $NO_2$;

a first sub-assembly in exhaust gas communication with the heavy-duty diesel engine, the sub-assembly comprising:
(i) a Pt oxidation catalyst deposited upon a ceramic through-flow honeycomb support, and
(ii) a wall-flow particulate trap;

a second sub-assembly comprising:
(i) a transitional metal/zeolite SCR catalyst; and
(ii) a urea reductant injector positioned in an exhaust pipe connecting the first and second sub-assemblies, the urea reductant injector configured to inject a metered dose of urea reductant into the exhaust gas;

wherein the system is configured such that, under the majority of normal on-road operational conditions of the heavy-duty diesel truck engine, (a) the first sub-assembly is operated at a temperature of between 250° C. and 425° C., and the exhaust gas exiting the first sub-assembly has an NO to NO2 ratio pre-determined to be sufficient for the second sub-assembly and at least a substantial percentage of soot-type particulates have been eliminated relative to an amount of soot-type particulates in the exhaust gas entering the first sub-assembly, and (b) the second sub-assembly is operated at a temperature cooler than the temperature in the first sub-assembly and the exhaust gas exiting the second sub-assembly has at least 90% less NOx relative to an amount of NOx in the exhaust gas entering the first sub-assembly.

27. The system of claim 26, wherein the oxidation catalyst and particulate trap are sized and configured to provide an exhaust gas stream with a ratio of NO to $NO_2$ of 4:1 to 1:3 at the exit of the particulate trap.

28. The system of claim 26, further comprising a clean-up catalyst in exhaust gas communication downstream of the second sub-assembly, the clean-up catalyst configured to remove $NH_3$ from the exhaust gas.

29. The system of claim 26, wherein the first sub-assembly comprises:
(i) the Pt oxidation catalyst deposited upon a ceramic through-flow honeycomb support, and
(ii) the wall-flow particulate trap.

30. The system of claim 29, wherein the second sub-assembly comprises the transitional metal/zeolite SCR catalyst and the urea injector.

31. The system of claim 29, further comprising a clean-up catalyst in exhaust gas communication downstream of the second sub-assembly, the clean-up catalyst configured to remove $NH_3$ from the exhaust gas.

32. The system of claim 26, wherein the second sub-assembly comprises the transitional metal/zeolite SCR catalyst and the urea injector.

33. The system of claim 32, further comprising a clean-up catalyst in exhaust gas communication downstream of the second sub-assembly, the clean-up catalyst configured to remove $NH_3$ from the exhaust gas.

34. The system of claim 32, further comprising a clean-up catalyst in exhaust gas communication downstream of the second sub-assembly, the clean-up catalyst configured to remove $NH_3$ from the exhaust gas.

* * * * *